A. W. & J. N. MARTIN.
LOCK FOR GREASE CUP CAPS.
APPLICATION FILED APR. 22, 1918.
1,278,706.
Patented Sept. 10, 1918.
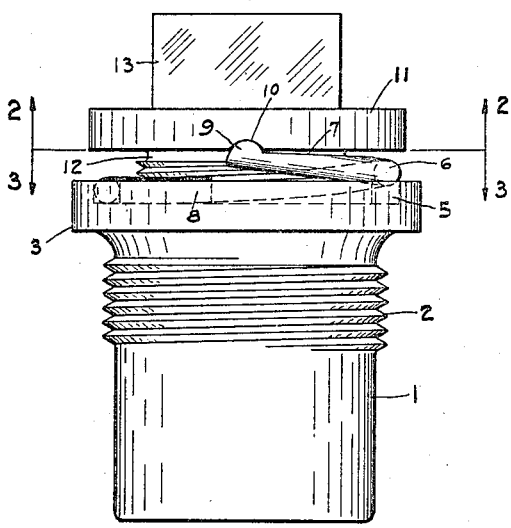
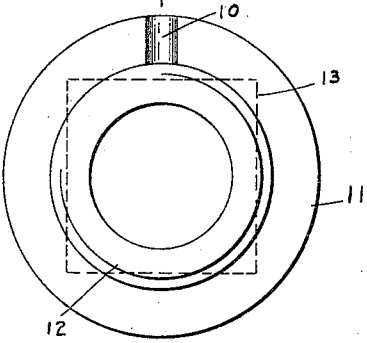
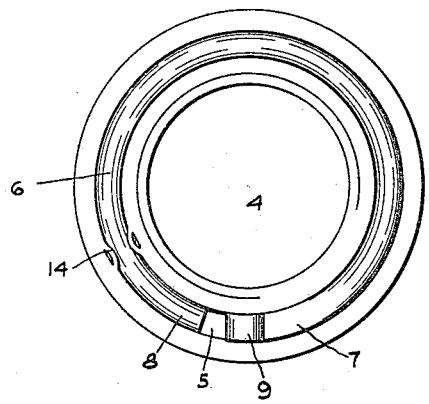
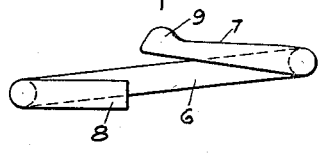
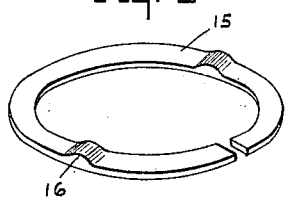
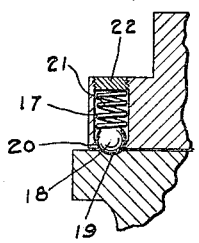
INVENTOR
ALBERT W. MARTIN.
JACOB N. MARTIN.
BY
ATTORNEYS.

UNITED STATES PATENT OFFICE.

ALBERT WM. MARTIN, OF INDIANAPOLIS, AND JACOB N. MARTIN, OF BEECH GROVE, INDIANA.

LOCK FOR GREASE-CUP CAPS.

1,278,706.  Specification of Letters Patent.  Patented Sept. 10, 1918.

Application filed April 22, 1918. Serial No. 230,057.

*To all whom it may concern:*

Be it known that we, ALBERT W. MARTIN and JACOB N. MARTIN, citizens of the United States, and residents of Indianapolis and Beech Grove, county of Marion, and State of Indiana, have invented a certain new and useful Lock for Grease-Cup Caps; and we do hereby declare that the following is a full, clear, and exact description thereof, reference being had to the accompanying drawings, in which like numerals refer to like parts.

This invention relates to improvements in grease cups and is particularly applicable for use in connection with driving rods of locomotives and other parts of machinery having revoluble movement while in use.

The prime feature of the invention is in providing means for normally holding the cap for closing the upper end of the grease cup against rotation regardless of the vibration or jarring movement which the same may receive.

A further feature of the invention is in so constructing the means employed for holding the cap against rotation that it will operate even when the cap is not turned down to its full extent upon the grease cup, thus adapting the same for gradually feeding or forcing the grease downwardly in the cup.

A further feature of the invention is in the manner of attaching the cap-holding mechanism to the grease cup.

Other objects and advantages will be hereinafter fully set forth and pointed out in the accompanying specification.

In the drawings which are made a part of this application Figure 1 is an elevation of a grease cup showing the cap in locked position and but partially seated thereon. Fig. 2 is a bottom plan view of the cap removed from the grease cup. Fig. 3 is a top plan view of the grease cup. Fig. 4 is an edge elevation of the locking ring removed from the grease cup. Fig. 5 is a perspective view of a modified form of locking ring. Fig. 6 is an edge elevation thereof. Fig. 7 is a detail sectional view of the grease cup and cap, showing a further modified form of locking device.

Referring to the drawings in which similar reference numerals designate corresponding parts throughout the several views, 1 indicates a grease cup, which may be of any preferred structure but in this instance one which is adapted for use in connection with the driving rods of a locomotive, the exterior of the cup having threads 2 for engagement with threaded seats in the driving rods (not shown).

The upper end of the cup 1 is provided with an enlarged head 3, which surrounds the opening 4 in the grease cup, said head having a peripheral channel 5 in its upper end in which is seated a split locking ring 6.

The locking ring is substantially spirally arranged so that the split end 7 thereof will project upwardly above the end 8, the end 7 having a knob 9 thereon, the rounded surface of which is adapted to engage a seat 10 in the under face of the cap 11, and owing to the spring tension of the locking ring, will hold the cap against casual rotation.

The cap 11 has an extension or collar 12 which is exteriorly threaded to engage the threaded interior of the opening 4 and by which means the cap is turned onto or removed from the cup.

In filling grease cups of this class it is customary to pack as much of the grease within the cup as it will hold and then partially turn the cap onto the cup and leave the cap in this condition until a portion of the grease is consumed before turning the cap entirely down on the cup; and it frequently happens that when left in this condition the vibration, caused by the operation of the parts to which the grease cup is attached, will cause the cap to unscrew from the cup and become lost and this also frequently happens even when the cap is turned down its full distance unless very tightly clamped upon the cup.

By providing the locking ring, however, this objectionable feature is entirely overcome, as it would be impossible for the cap to be loosened through vibration so long as the knob 9 is engaged with the seat 10, and owing to the formation of the locking ring the knob will engage the seat while the body of the cap is still some distance from the end of the grease cup. The knob 9 and the seat 10 are so rounded that by applying a wrench to the nut 13 on the cap, said cap can be easily rotated in either direction.

The ring 6 is securely held in engagement with the head 3 and in the channel 5 so that the same will not be misplaced or removed from the channel when the cap is removed, by swaging or upsetting the edges of the channel to form over-hanging lips 14, which bind on the ring 6, said lips also preventing the ring from moving circularly in the channel.

The ring 15 shown in Fig. 5 of the drawing while being a split ring is substantially flat in cross section and is slightly bowed upwardly so that it rests upon the base of the channel under normal conditions at two points only, the upwardly bowed portions of the ring having knobs 16 thereon for engagement with the seat 10 in the cap.

In applying that form of device shown in Fig. 7, a bore 17 is formed through the cap 11 and in said bore is placed a ball 18 which engages with the socket 19 in the upper face of the cup 1, the downward movement of the ball being limited by providing a rib 20 at the lower end of the bore 17. After the ball is placed within the bore 17 a spring 21 is introduced into the bore above the ball and the upper end of the bore is then closed by means of a plug 22, the upper end of the spring pressing against the plug. In this form of device when the cap is rotated, the ball will overcome the pressure of the spring and ride out of the socket 19, but when engaged with the said socket will hold the cap against casual rotation.

Although we have described the grease cup as primarily used in connection with parts of a locomotive, yet it would be understood that it is applicable for use at any place where a grease cup is required, and it will likewise be seen that the locking means may be employed for various purposes where it is desired to hold a movable part in connection with a stationary part.

The invention claimed is:—

1. The combination with a grease cup, and a cap adapted to be screwed onto said cup, one of said members having a channel in the inner end thereof and the other member having a seat in the inner end thereof, said channel and said seat being exteriorly of the threaded portion of the cup and cap, of a locking ring adapted to seat in said channel and having one of its ends projecting yieldingly with a knob thereon adapted to engage said seat and hold the cap against casual rotation.

2. The combination with a grease cup, and a cap adapted to screw onto said cup, one of said members having a channel in the inner end thereof, and the other member having a seat in the inner end thereof, said channel and said seat being exteriorly of the threaded portions of the cup and cap, of a split locking ring adapted to enter said channel, with a yielding knob on one end of the locking ring adapted to engage said seat and hold the cap against casual rotation, and means for employing integral parts of the cup for locking the ring within the channel.

3. The combination with a grease cup having an enlarged head surrounding the opening therein, said head having a peripheral channel in its upper face, and a cap adapted to be screwed onto the end of said cup, the screw portion passing within said channel, said cap having a seat in its lower face exteriorly of the threaded portion, of a spirally arranged split locking ring in said channel, with a knob on one end of said ring adapted to frictionally engage said seat, and means to bind the locking ring within said recess and hold the same against rotating movement.

4. The combination with a grease cup having a channel in the upper end thereof, of a split locking ring adapted to enter said channel, and lips formed by swaging inwardly the edges of said channel for locking the split ring against movement within the channel.

In witness whereof we have hereunto affixed our signatures.

ALBERT WM. MARTIN.
JACOB N. MARTIN.

Copies of this patent may be obtained for five cents each, by addressing the "Commissioner of Patents, Washington, D. C."